United States Patent
Xu et al.

(10) Patent No.: US 11,569,932 B2
(45) Date of Patent: Jan. 31, 2023

(54) FULL-DUPLEX CONTROL BASED ON DYNAMIC UPLINK SKIPPING

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/303,019

(22) Filed: May 18, 2021

(65) Prior Publication Data

US 2022/0376818 A1 Nov. 24, 2022

(51) Int. Cl.
*H04W 72/14* (2009.01)
*H04L 1/00* (2006.01)
(Continued)

(52) U.S. Cl.
CPC .......... *H04L 1/0025* (2013.01); *H04B 7/0626* (2013.01); *H04L 5/14* (2013.01);
(Continued)

(58) Field of Classification Search
CPC ......... H04W 72/1226; H04W 72/1268; H04W 72/1273; H04W 72/14; H04L 5/14; H04L 1/0025; H04B 7/0626
See application file for complete search history.

(56) References Cited

U.S. PATENT DOCUMENTS

| | | | | |
|---|---|---|---|---|
| 5,825,755 A | * | 10/1998 | Thompson | ............ H04L 12/413 370/445 |
| 7,415,282 B2 | * | 8/2008 | Tillet | .................... H04W 76/20 455/552.1 |

(Continued)

OTHER PUBLICATIONS

Fraunhofer; "Motivation Paper for a New Study Item (SI): Self-Interference Cancellation and Flexible Duplexing Schemes in 5G-NR Cellular Networks"; 3GPP TSG RAN Meeting #91-e Electronic Meeting, Mar. 16-26, 2021; RP-210571 (Year: 2021).*

*Primary Examiner* — Gary Mui
(74) *Attorney, Agent, or Firm* — Harrity & Harrity LLP/Qualcomm Incorporated

(57) ABSTRACT

In a wireless network, a user equipment (UE) may skip an uplink transmission associated with a dynamic uplink grant. In such cases, when the UE skips an uplink transmission that would have been concurrent with a downlink transmission, the UE may perform one or more mode-dependent control operations. For example, because the uplink transmission would result in a full-duplex operation if the UE were to perform the uplink transmission, the UE may reset a timer associated with switching from a full-duplex mode to a half-duplex mode and/or perform one or more mode-dependent control operations in the full-duplex mode. Alternatively, because the UE refrains from performing the uplink transmission that would have resulted in a full-duplex operation, the UE may maintain the timer associated with switching from the full-duplex mode to the half-duplex mode and/or perform the one or more mode-dependent control operations in the half-duplex mode.

30 Claims, 8 Drawing Sheets

(51) Int. Cl.
*H04L 5/14* (2006.01)
*H04B 7/06* (2006.01)
*H04W 72/12* (2009.01)

(52) U.S. Cl.
CPC ... *H04W 72/1226* (2013.01); *H04W 72/1268* (2013.01); *H04W 72/1273* (2013.01); *H04W 72/14* (2013.01)

(56) References Cited

U.S. PATENT DOCUMENTS

| | | | |
|---|---|---|---|
| 2020/0053793 A1* | 2/2020 | Loehr | H04W 72/042 |
| 2020/0228301 A1* | 7/2020 | Choi | H04W 72/121 |
| 2021/0410092 A1* | 12/2021 | Xu | H04L 5/1461 |
| 2022/0109551 A1* | 4/2022 | Bai | H04L 5/0096 |

* cited by examiner

FULL-DUPLEX CONTROL BASED ON DYNAMIC UPLINK SKIPPING

FIELD OF THE DISCLOSURE

Aspects of the present disclosure generally relate to wireless communication and to techniques and apparatuses associated with full-duplex control based on dynamic uplink skipping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a wireless network, one or more devices may be equipped with full-duplex capabilities that enable the one or more devices to simultaneously receive and transmit. For example, full-duplex capabilities may be enabled at a base station and/or one or more transmit receive points to support simultaneous downlink transmission and uplink reception, at a user equipment (UE) to support simultaneous downlink reception and uplink transmission, and/or a combination thereof. In general, full-duplex communication may be enabled in a full-band full-duplex mode, where simultaneous transmission and reception occurs in an overlapping frequency bandwidth, or in a sub-band full-duplex mode, where simultaneous transmission and reception occurs in separate (e.g., adjacent) spectrum on the same carrier. Accordingly, relative to communication in a half-duplex mode (e.g., where a device can only transmit or receive in a particular time instant or on separate carriers), full-duplex communication may reduce latency, enhance spectral efficiency or throughput, and/or increase resource utilization efficiency because time and/or frequency resources can be simultaneously utilized for uplink and downlink communication.

However, in some cases, enabling full-duplex communication may present issues that are more challenging and/or complex than half-duplex communication. For example, a device configured to communicate in a full-duplex mode may experience self-interference caused by concurrent transmission and reception, as signal energy from one or more transmit circuits may leak into one or more receive circuits and/or enter the receive circuit(s) after reflecting off one or more objects in a surrounding environment. Accordingly, in order to mitigate the self-interference, a device may need to measure and cancel the self-interference from the receive circuit(s), which tends to be a challenging and complex process. For example, because a UE communicating in full-duplex mode needs to select transmit and receive beams that provide sufficient spatial separation to minimize self-interference, the UE may be unable to use optimal transmit and receive beams that simultaneously maximize channel gain in the full-duplex mode. In another example, full-duplex mode may restrict the maximum transmit power that the UE can use.

Accordingly, even though a UE may support full-duplex communication, the UE may switch to half-duplex mode when possible in order to utilize optimal transmit and receive beams and/or increase a maximum transmit power, among other examples. For example, a UE may dynamically switch to a full-duplex mode when a full-duplex operation (simultaneous transmission and reception) is performed and otherwise operate in a half-duplex mode, switch between the full-duplex mode and the half-duplex mode based on a time domain pattern configured by a wireless network, and/or switch between the full-duplex mode and the half-duplex mode based on a timer that is started when the UE switches from the half-duplex mode to the full-duplex mode and reset whenever a full-duplex operation is performed. However, switching mechanisms that are dependent on whether and/or when the UE performs a full-duplex operation generally lack features to handle cases where a UE skips an uplink transmission that would have resulted in a full-duplex operation (e.g., the skipped uplink transmission completely or partially overlaps with one or more downlink transmissions in a time domain). For example, a wireless network may allow a UE to skip an uplink transmission associated with an uplink grant in cases where the UE does not have any uplink data available to transmit and/or the uplink data available to transmit fails to satisfy a threshold (e.g., the UE only has a small amount of uplink data). In such cases, UE behavior with respect to switching to or from the full-duplex mode may be undefined or ambiguous. For example, when a UE skips an uplink transmission that would have resulted in a full-duplex operation, dynamic switching, pattern-based switching, and/or timer-based switching mechanisms do not specify whether the UE is to switch to or remain in the full-duplex mode because the uplink transmission would have resulted in a full-duplex operation or switch to or remain in the half-duplex mode because the UE is only receiving a downlink transmission at the time of the (skipped) uplink transmission.

Some aspects described herein relate to techniques and apparatuses to configure full-duplex control operations when a UE skips an uplink transmission that would have resulted in a full-duplex operation at the UE. For example, in some aspects, the UE may receive an uplink grant scheduling an uplink transmission at the same time as a downlink transmission. In cases where the UE skips the uplink transmission that would have resulted in a full-duplex operation, the UE may perform one or more mode-dependent control operations. For example, in some aspects, the UE may maintain a timer associated with switching from a full-duplex mode to a half-duplex mode to reflect actual operation of the UE (e.g., performing a half-duplex downlink-only operation at the time of the skipped uplink transmission), or the UE may reset the timer to reflect that the uplink transmission would have resulted in a full-duplex operation if the UE were to have used the uplink grant to perform the uplink transmission. Furthermore, in some aspects, the one or more mode-dependent control operations may include selecting an optimal receive beam based on a half-duplex mode or a full-duplex mode, configuring a channel state feedback report to exclude or include self-interference measurements, and/or selecting a half-duplex or full-duplex transmission configuration indication state to receive a physical downlink control channel.

In some aspects, a UE for wireless communication includes a memory and one or more processors, coupled to the memory, configured to: receive an uplink grant for an uplink transmission prior to expiration of a timer associated with switching from a full-duplex mode to a half-duplex mode, wherein at least a portion of the uplink transmission is scheduled concurrently with a downlink transmission; and perform an operation to control the timer associated with switching from the full-duplex mode to the half-duplex mode based at least in part on skipping the uplink transmission.

In some aspects, a method of wireless communication performed by a UE includes receiving an uplink grant for an uplink transmission prior to expiration of a timer associated with switching from a full-duplex mode to a half-duplex mode, wherein at least a portion of the uplink transmission is scheduled concurrently with a downlink transmission; and performing an operation to control the timer associated with switching from the full-duplex mode to the half-duplex mode based at least in part on skipping the uplink transmission.

In some aspects, a non-transitory computer-readable medium storing a set of instructions for wireless communication includes one or more instructions that, when executed by one or more processors of a UE, cause the UE to: receive an uplink grant for an uplink transmission prior to expiration of a timer associated with switching from a full-duplex mode to a half-duplex mode, wherein at least a portion of the uplink transmission is scheduled concurrently with a downlink transmission; and perform an operation to control the timer associated with switching from the full-duplex mode to the half-duplex mode based at least in part on skipping the uplink transmission.

In some aspects, an apparatus for wireless communication includes means for receiving an uplink grant for an uplink transmission prior to expiration of a timer associated with switching from a full-duplex mode to a half-duplex mode, wherein at least a portion of the uplink transmission is scheduled concurrently with a downlink transmission; means for and means for performing an operation to control the timer associated with switching from the full-duplex mode to the half-duplex mode based at least in part on skipping the uplink transmission.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
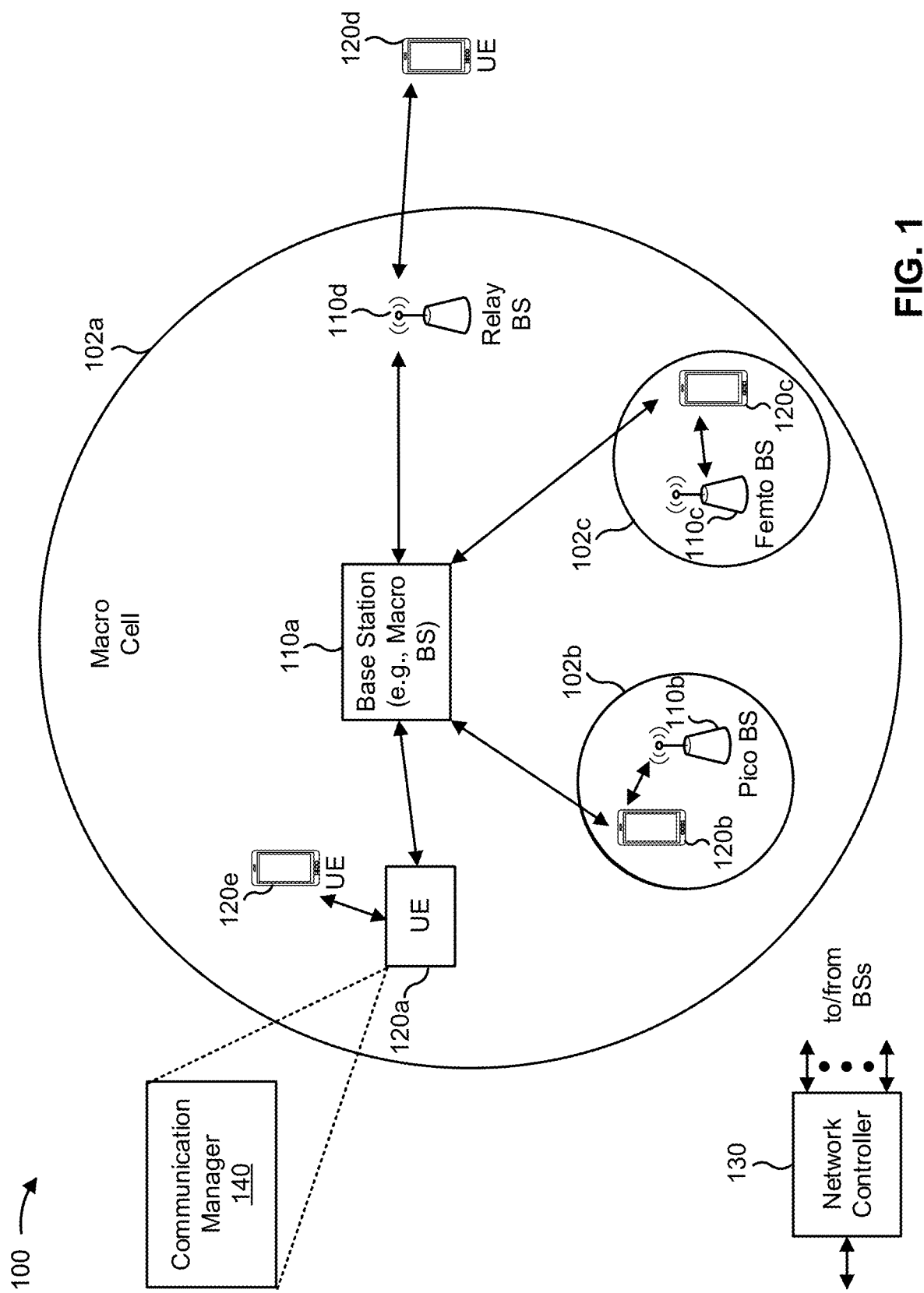
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive an uplink grant for an uplink transmission prior to expiration of a timer associated with switching from a full-duplex mode to a half-duplex mode, wherein at least a portion of the uplink transmission is scheduled concurrently with a downlink transmission; and perform an operation to control the timer associated with switching from the full-duplex mode to the half-duplex mode based at least in part on skipping the uplink transmission. Additionally, or alternatively, the communication manager 140 may perform one or more other operations described herein.

As indicated above, FIG. 1 is provided as an example. Other examples may differ from what is described with regard to FIG. 1.

Figure 2:
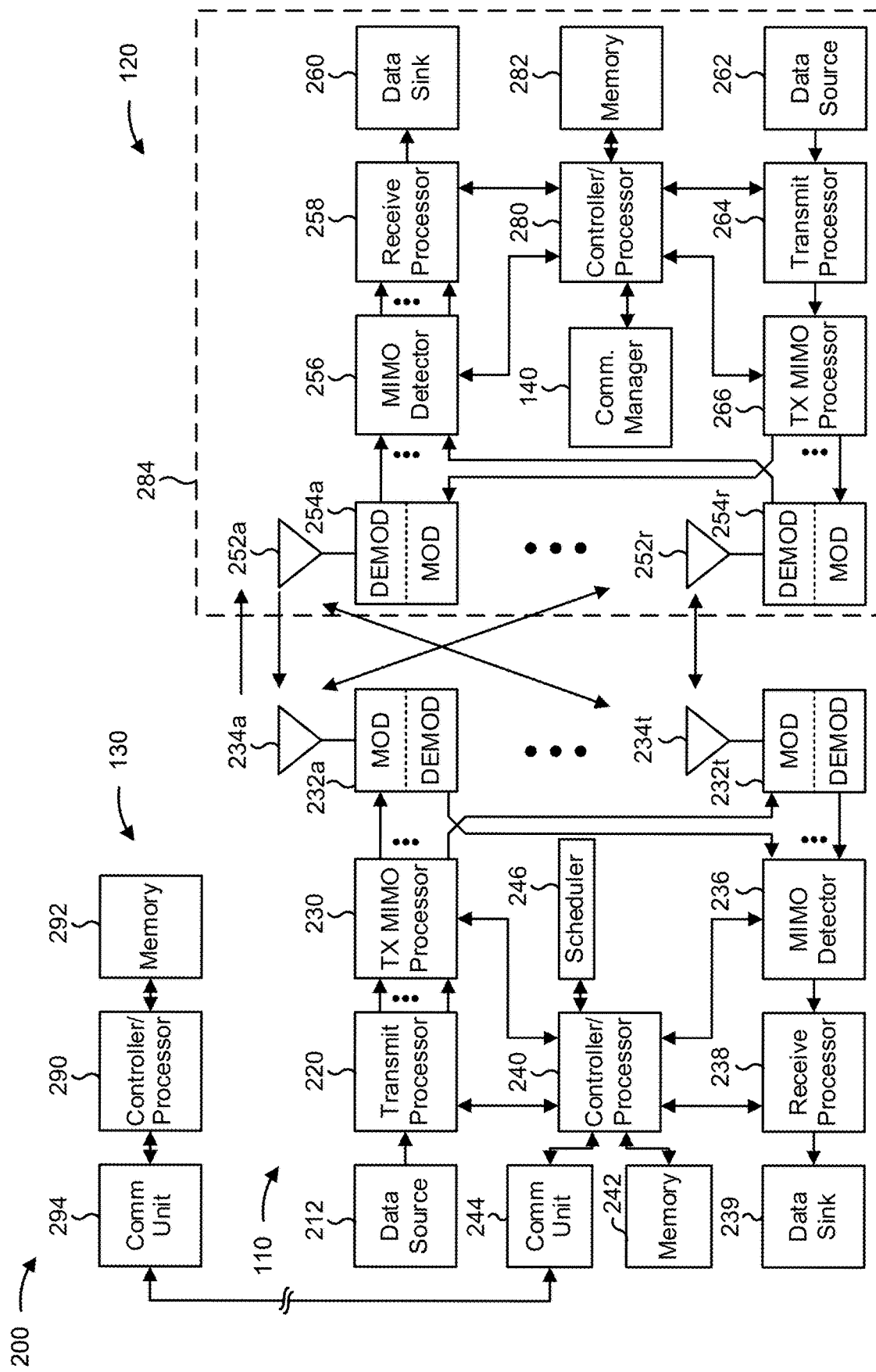
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM)) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with full-duplex control based on dynamic uplink skipping, as described in more detail elsewhere herein. For example, controller/processor 240 of base station 110, controller/processor 280 of UE 120, and/or any other component(s) of FIG. 2 may perform or direct operations of, for example, method 600 of FIG. 6 and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for receiving an uplink grant for an uplink transmission prior to expiration of a timer associated with switching from a full-duplex mode to a half-duplex mode, wherein at least a portion of the uplink transmission is scheduled concurrently with a downlink transmission; and/or means for performing an operation to control the timer associated with switching from the full-duplex mode to the half-duplex mode based at least in part on skipping the uplink transmission. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
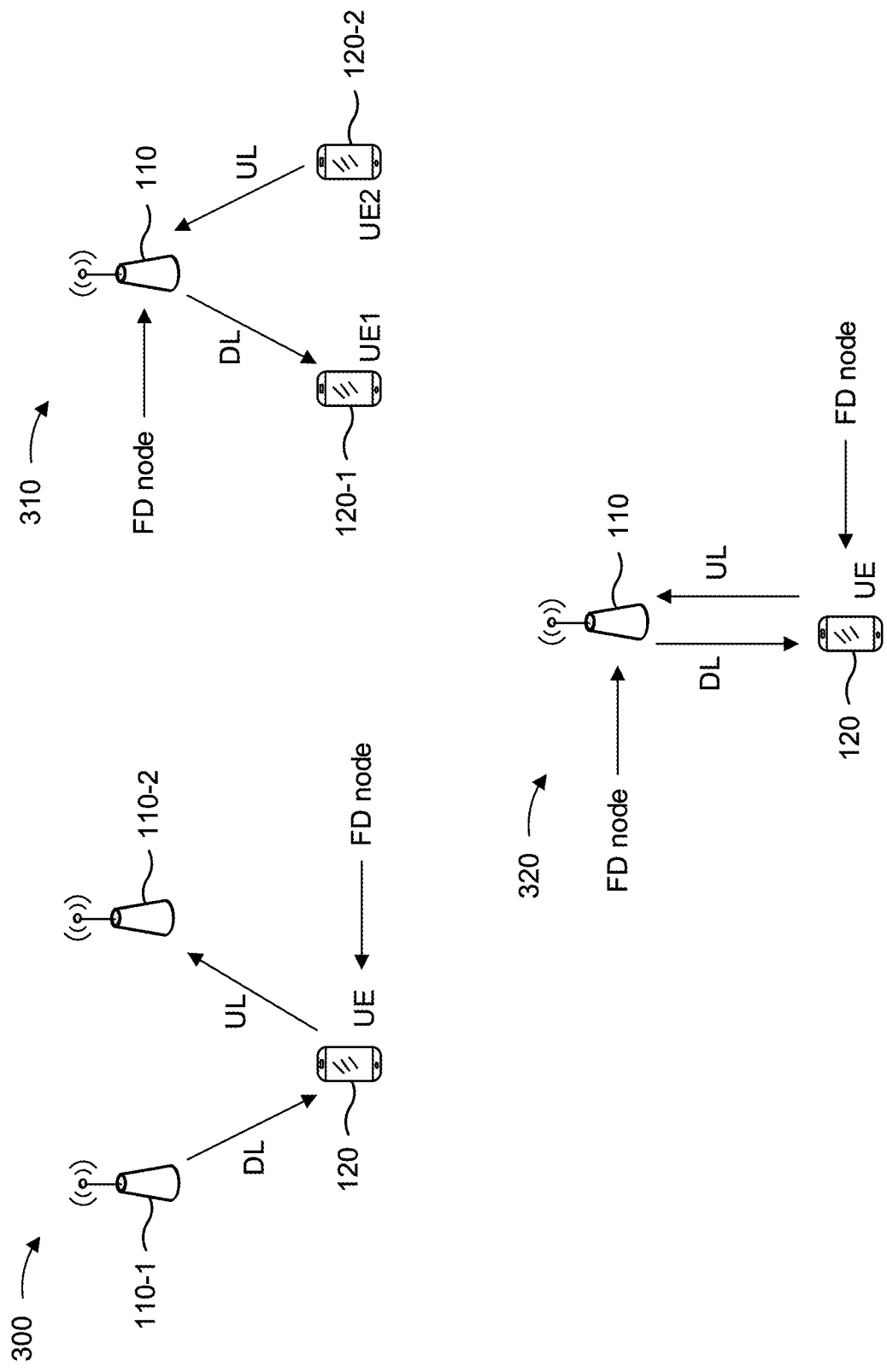
FIG. 3 is a diagram illustrating examples of full-duplex communication.

FIG. 3 is a diagram illustrating examples 300, 310, 320 of full-duplex communication. As shown in FIG. 3, examples 300, 310, 320 generally include one or more UEs 120 in communication with one or more base stations (or TRPs) 110 in a wireless network that supports full-duplex communication.

As shown in FIG. 3, example 300 includes a UE 120 in communication with a first base station 110-1 and a second base station 110-2. As shown, in example 300, the UE 120 may transmit one or more uplink transmissions to the first base station 110-1 and may concurrently receive one or more downlink transmissions from the second base station 110-2. Accordingly, in example 300, full-duplex communication is enabled for the UE 120, which may be operating as a full-duplex node, but not for the base stations 110-1, 110-2, which may be operating as half-duplex nodes. Additionally, or alternatively, as shown by example 310, a first UE 120-1 and a second UE 120-2 may be in communication with the same base station 110. In this case, the base station 110 may transmit one or more downlink transmissions to the first UE 120-1 and may concurrently receive one or more uplink transmissions from the second UE 120-2. Accordingly, in example 310, full-duplex communication is enabled for the base station 110, which may be operating as a full-duplex node, but not for the UEs 120-1, 120-2, which may be operating as half-duplex nodes. Additionally, or alternatively, as shown by example 320, a UE 120 may be in communication with a base station 110. In example 320, the base station 110 may transmit, and the UE 120 may receive, one or more downlink transmissions concurrently with the UE 120 transmitting, and the base station 110 receiving, one or more uplink transmissions. Accordingly, in example 320, full-duplex communication is enabled for both the UE 120 and the base station 110, each of which is operating as a full-duplex node.

As indicated above, FIG. 3 is provided as an example. Other examples may differ from what is described with regard to FIG. 3.

Figure 4:
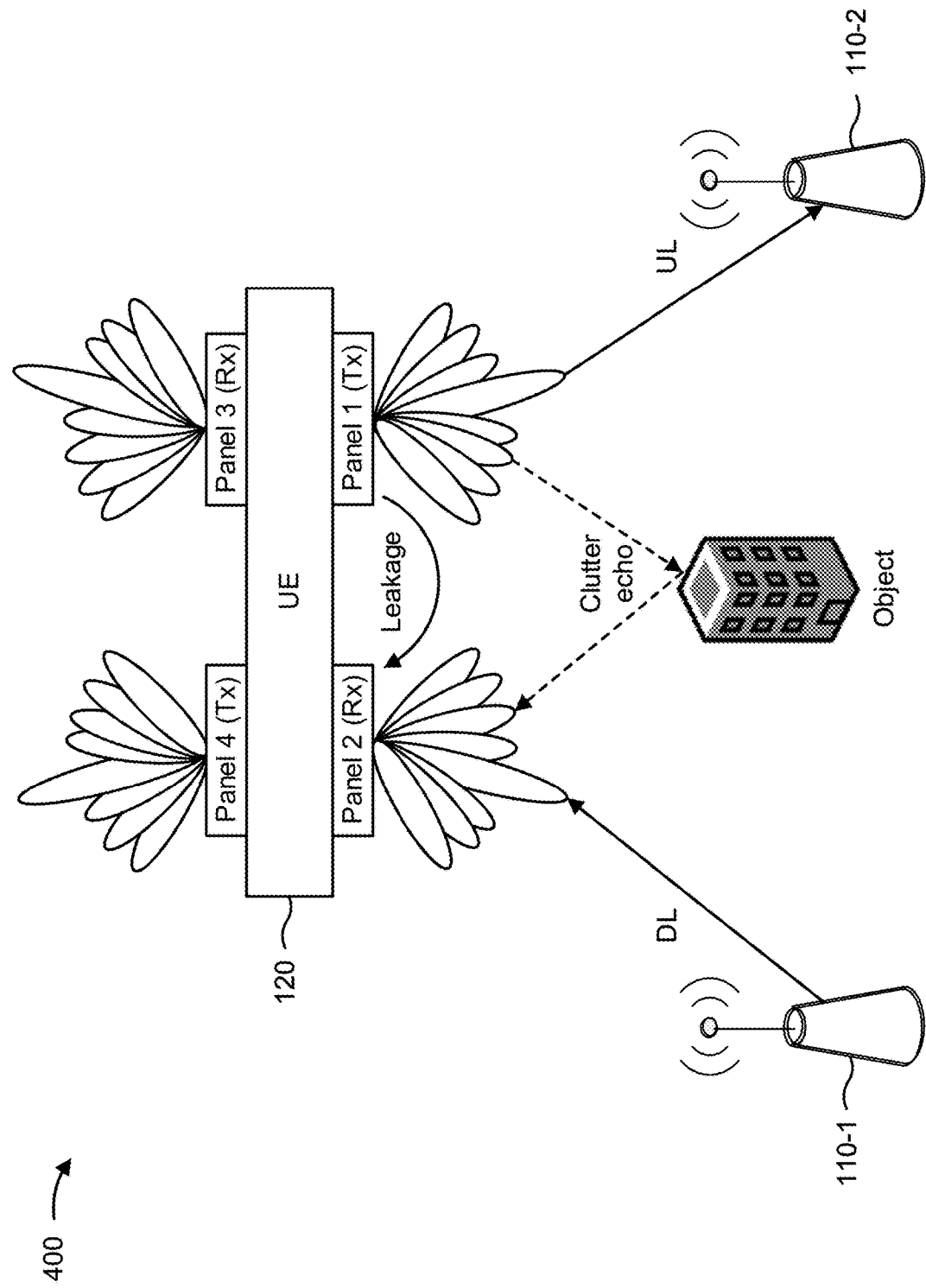
FIG. 4 is a diagram illustrating an example of spatial isolation to mitigate self-interference in full-duplex communication.

FIG. 4 is a diagram illustrating an example 400 of spatial isolation to mitigate self-interference in full-duplex communication. For example, as shown in FIG. 4, a UE 120 may operate in a full-duplex mode that enables the UE 120 to concurrently receive a downlink signal from a first base station or TRP 110-1 and transmit an uplink signal to a second base station or TRP 110-2 (or the UE 120 may communicate with one base station or TRP in the full-duplex communication mode). In general, in order to mitigate self-interference, full-duplex communication may be conditional on a beam separation between an uplink beam and a downlink beam at different antenna panels.

For example, as shown in FIG. 4, the UE 120 may have multiple antenna panels (e.g., antenna arrays), and each antenna panel may be associated with one or more beam groups that can be used for uplink communication or for downlink communication. For example, in FIG. 4, the UE 120 has four antenna panels that are associated with respective beam groups (e.g., a first panel may be associated with beams that are indexed 1-8, a second panel may be associated with beams that are indexed 9-16, a third panel may be associated with beams that are indexed 17-24, and a fourth panel may be associated with beams that are indexed 25-32). Furthermore, when full-duplex communication is enabled at the UE 120, one or more antenna panels (e.g., the first and fourth panels) may be configured for uplink transmission, and one or more antenna panels (e.g., the second and third panels) may be configured for downlink reception.

In this way, utilizing full-duplex communication may reduce latency by enabling the UE 120 to receive a downlink signal in an uplink-only slot and/or transmit an uplink signal in a downlink-only slot. Further, full-duplex communication may enhance spectral efficiency or throughput and may enable more efficient resource utilization by simultaneously utilizing time and frequency resources for uplink and downlink communication. However, because full-duplex communication depends on sufficient spatial separation between uplink and downlink beams to assist in limiting or reducing self-interference, full-duplex communication may be restricted from using interfering uplink and downlink beam pairs. If the UE 120 is unable to identify any uplink and downlink beam pair(s) that can provide sufficient spatial separation, the UE 120 may be unable to support full-duplex communication.

For example, in some cases, an uplink and downlink beam pair may not provide sufficient spatial separation if the uplink beam causes self-interference with respect to the downlink beam, which may occur when a transmitted signal leaks into a receive port (e.g., shown in FIG. 4 as leakage from the first panel configured for uplink transmission into the second panel configured for downlink reception). Additionally, or alternatively, self-interference may occur when an object reflects a transmitted signal back to a receive port (e.g., causing a clutter echo effect). For example, as shown in FIG. 4, a signal transmitted by the first antenna panel toward base station 110-2 may reflect off a reflecting (clutter echo-causing) object and into the second antenna panel, which may cause interference with a downlink signal transmitted from base station 110-1 toward the second antenna panel. Accordingly, whether full-duplex communication can be performed may depend on selecting suitable uplink and downlink beam pairs (e.g., transmit and receive beams that are on different antenna panels) to reduce or minimize self-interference (e.g., clutter echo) via spatial isolation. In some aspects, determining the uplink and downlink beams that are separated on respective antenna panels may provide a reliable full-duplex communication by selecting beam pairs that minimize or reduce self-interference.

Accordingly, measuring self-interference at a wireless node having full-duplex capabilities may assist in determining uplink and downlink beam pairs that may support full-duplex communication. For example, in some aspects, the UE 120 may obtain self-interference measurements to determine one or more candidate uplink transmit beams that can be paired with one or more candidate downlink receive beams. Additionally, or alternatively, a base station 110 communicating with the UE 120 in a full-duplex mode may obtain self-interference measurements to identify one or more candidate uplink receive beams that can be paired with one or more candidate downlink transmit beams. In general, to obtain the self-interference measurements, a wireless node with full-duplex capabilities may transmit a signal from a first set of antennas in one or more transmit beam directions and may concurrently measure a received signal (e.g., a reflected or leaked transmit signal) on a second set of antennas in one or more receive beam directions.

Accordingly, although full-duplex communication may enable latency savings, enhance spectral efficiency or throughput, and/or enable more efficient resource utilization, the UE 120 may switch to half-duplex mode when possible in order to utilize optimal transmit and receive beams that simultaneously maximize channel gain and/or to increase a maximum transmit power, among other examples. For example, the UE 120 may dynamically switch to a full-duplex mode when a full-duplex operation (simultaneous transmission and reception on the same carrier) is performed and otherwise operate in a half-duplex mode, may switch between the full-duplex mode and the half-duplex mode based on a time domain pattern configured by a wireless network, and/or may switch between the full-duplex mode and the half-duplex mode based on a timer that is started when the UE 120 switches from the half-duplex mode to the full-duplex mode and reset whenever the UE 120 performs a full-duplex operation.

However, switching mechanisms that are dependent on whether and/or when the UE 120 performs a full-duplex operation generally lack features to handle cases where the UE 120 determines to skip an uplink transmission that would have otherwise resulted in a full-duplex operation (if the uplink transmission were performed). For example, a wireless network may enable the UE 120 to skip an uplink transmission associated with an uplink grant in cases where the UE 120 does not have any uplink data available to transmit and/or the uplink data available to transmit fails to satisfy a threshold (e.g., the UE 120 only has a small amount of uplink data). In such cases, UE behavior with respect to switching to or from the full-duplex mode may be undefined or ambiguous. For example, when the UE 120 skips an uplink transmission that would have resulted in a full-duplex operation, dynamic switching, pattern-based switching, and/or timer-based switching mechanisms do not specify whether the UE 120 is to switch to or remain in the full-duplex mode because the uplink transmission would have resulted in a full-duplex operation or switch to or remain in the half-duplex mode because the UE 120 is only receiving a downlink transmission at the time of the (skipped) uplink transmission.

Some aspects described herein relate to techniques and apparatuses to configure full-duplex control operations when a UE skips an uplink transmission that would have resulted in a full-duplex operation at the UE. For example, in some aspects, the UE may receive an uplink grant scheduling an uplink transmission at the same time as a downlink transmission. In cases where the UE skips the uplink transmission that would have resulted in a full-duplex operation, the UE may perform one or more mode-dependent control operations. For example, in some aspects, the UE may maintain a timer associated with switching from a full-duplex mode to a half-duplex mode to reflect actual operation of the UE (e.g., performing a half-duplex downlink-only operation at the time of the skipped uplink transmission), or the UE may reset the timer to reflect that the uplink transmission would have resulted in a full-duplex operation if the UE were to have used the uplink grant to perform the uplink transmission. Furthermore, in some aspects, the one or more mode-dependent control operations may include selecting an optimal receive beam based on a half-duplex mode or a full-duplex mode, configuring a channel state feedback (CSF) report to exclude or include self-interference measurements, and/or selecting a half-duplex or full-duplex transmission configuration indication (TCI) state to receive a physical downlink control channel (PDCCH).

As indicated above, FIG. 4 is provided as an example. Other examples may differ from what is described with regard to FIG. 4.

Figure 5:
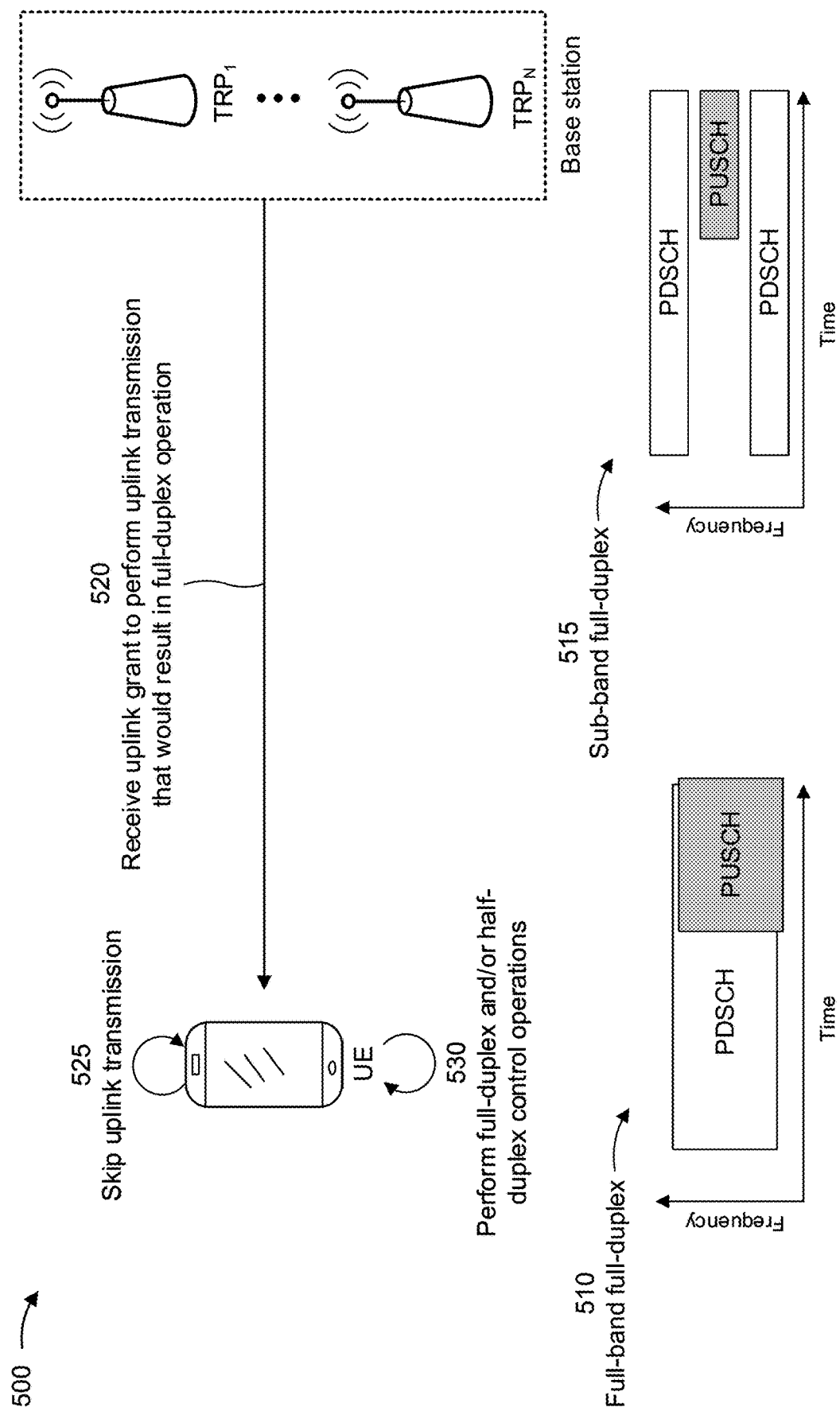
FIG. 5 is a diagram illustrating an example associated with full-duplex control based on dynamic uplink skipping.

FIG. 5 is a diagram illustrating an example 500 associated with full-duplex control based on dynamic uplink skipping. As shown in FIG. 5, a UE (e.g., UE 120) may communicate with a base station (e.g., base station 110) in a wireless network (e.g., wireless network 100). In some aspects, the UE may be configured to communicate with the base station in a full-duplex communication mode (e.g., via one or more TRPs). For example, as shown at 510, full-duplex communication may be enabled in a full-band full-duplex mode, where the UE simultaneously receives a downlink transmission (e.g., a physical downlink shared channel (PDSCH)) and performs an uplink transmission (e.g., a physical uplink shared channel (PUSCH)) in an overlapping frequency bandwidth. Additionally, or alternatively, as shown at 515, full-duplex communication may be enabled in a sub-band full-duplex mode, where simultaneous transmission and reception occurs in separate (e.g., adjacent) spectrum on the same carrier that may be separated by a guard band.

Although FIG. 5 illustrates an example full-duplex operation that includes a simultaneous (e.g., completely or partially overlapping) PDSCH and PUSCH, it will be appreciated that, as described herein, a "full-duplex operation" may refer to any downlink and uplink transmissions that are partially or completely concurrent or simultaneous. For example, in some aspects, a full-duplex operation may include a downlink and/or uplink transmission associated with a dynamic grant, an uplink transmission associated with a configured grant, a downlink transmission associated with a semi-persistent scheduling (SPS) configuration, and/or a higher-layer configured channel (e.g., a control channel or a data channel) and/or signal (e.g., a reference signal), among other examples.

Relative to communication in a half-duplex mode (e.g., where a device can only transmit or receive in a particular time instant), full-duplex communication may reduce latency, enhance spectral efficiency or throughput, and/or increase resource utilization efficiency because time and/or frequency resources can be simultaneously utilized for uplink and downlink communication. However, as described above, half-duplex communication may offer reduced complexity relative to full-duplex communication (e.g., by avoiding a need to measure and/or mitigate self-interference) and/or improved performance relative to full-duplex communication (e.g., by enabling the UE to use optimal transmit and receive beams that maximize channel gain and/or by enabling a higher maximum transmit power). Accordingly, the UE may be associated with a full-duplex configuration that enables the UE to switch between the full-duplex communication mode and a half-duplex communication mode. In some aspects, the UE may be configured to switch between the full-duplex mode and the half-duplex mode based on dynamic triggering, pattern-based switching, and/or timer-based switching.

For example, in cases where the UE is configured to switch between the full-duplex mode and the half-duplex mode based on dynamic triggering, the UE may switch to the full-duplex mode when a full-duplex operation (simultaneous transmission and reception) is scheduled, and the UE may otherwise operate in the half-duplex mode. Additionally, or alternatively, in cases where the UE is configured to switch between the full-duplex mode and the half-duplex mode based on pattern-based switching, the base station may configure a time domain pattern that indicates one or more durations in which the UE is to operate in the full-duplex mode and one or more durations in which the UE is to operate in the half-duplex mode. In cases where the UE is configured to switch between the full-duplex mode and the half-duplex mode based on timer-based switching, the UE may start a timer when switching from the half-duplex mode to the full-duplex mode (e.g., because a full-duplex operation is scheduled). In such cases, the UE may remain in the full-duplex mode while the timer has not expired, the timer may be reset whenever the UE performs a full-duplex operation, and the UE may switch back to the half-duplex mode after the timer has expired.

In some aspects, the UE may support a capability to skip an uplink transmission associated with a dynamic uplink grant if the UE does not have any uplink data to transmit. For example, in some aspects, the configuration may be based on a parameter (e.g., skipUplinkTxDynamic) that the UE reports to the base station to indicate that the UE supports skipping an uplink transmission associated with an uplink grant indicated in a PDCCH in cases where the UE does not have uplink data available to transmit. Additionally, or alternatively, the UE may skip a dynamically granted uplink transmission in cases where uplink data available to transmit fails to satisfy a threshold. For example, when the UE skips a dynamically granted uplink transmission, the UE may refrain from using resources indicated in the dynamic uplink grant to perform the uplink transmission, may drop the uplink transmission, may cancel the uplink transmission, and/or may delay the uplink transmission, among other examples.

As further shown in FIG. 5, at 520, the base station may transmit, and the UE may receive, a PDCCH that includes an uplink grant for an uplink transmission that would result in a full-duplex operation at the UE. For example, in some aspects, the PDCCH may include an uplink grant for a PUSCH that is completely or partially concurrent or overlapping with a dynamically scheduled PDSCH, a downlink SPS transmission, a downlink channel or downlink signal configured by a higher layer (e.g., a radio resource control (RRC) layer), and/or any other suitable downlink transmission. In some aspects, as described herein, the PUSCH may be completely or partially concurrent or overlapping with the downlink transmission in a time domain, a frequency domain, or both.

As further shown in FIG. 5, at 525, the UE may skip at least a portion of the uplink transmission associated with the uplink grant indicated in the PDCCH (e.g., an entirety of the uplink transmission and/or a portion of the uplink grant that is concurrent or overlapping with one or more downlink transmissions). For example, in some aspects, the UE may refrain from using resources indicated in the uplink grant to perform at least a portion of the uplink transmission, may drop at least a portion of the uplink transmission, cancel at least a portion of the uplink transmission, and/or delay at least a portion of the uplink transmission based on a determination that the UE does not have uplink data available to transmit and/or based on a determination that uplink data available to transmit fails to satisfy a threshold. In some aspects, when the UE skips at least a portion of the uplink transmission, the UE may effectively operate in a half-duplex mode (e.g., downlink-only) during the time resources that would have been occupied by the (skipped) uplink transmission.

Accordingly, at 530, the UE may perform one or more mode-dependent control operations based on skipping the uplink transmission that would have resulted in a full-duplex operation at the UE. For example, in cases where the UE is configured to switch between the full-duplex mode and the half-duplex mode based on timer-based switching, the UE may determine whether to reset the timer associated with switching between the full-duplex mode and the half-duplex mode if the uplink grant is received prior to expiration of the timer (e.g., while the UE is operating in the full-duplex mode). In some aspects, the UE may reset the timer associated with switching between the full-duplex mode and the half-duplex mode when skipping the uplink transmission because the uplink transmission, if performed, would have resulted in a full-duplex operation. However, in cases where the UE skips the uplink transmission because no uplink data or a small amount of uplink data is available to transmit, resetting the timer despite the UE skipping the uplink transmission may delay the UE from returning to the half-duplex mode if the UE does not have uplink data to transmit. Accordingly, in some aspects, the UE may refrain from resetting the timer associated with switching between the full-duplex mode and the half-duplex mode, which may reflect actual operation at the UE. For example, in cases where the UE does not perform an uplink transmission in a scheduled uplink resource, no full-duplex operation is performed, and the UE may be operating in a downlink-only half-duplex mode at the time that the uplink transmission is scheduled. In this way, maintaining the timer associated with switching between the full-duplex mode and the half-duplex mode may allow the timer to continue to run, and the UE may eventually transition to the half-duplex mode after the timer expires (e.g., no further uplink transmissions are scheduled and/or the UE continues to skip dynamically granted uplink transmissions due to a lack of uplink data to transmit).

Furthermore, in cases where the UE skips a dynamically granted uplink transmission that would have resulted in a full-duplex operation, the UE may determine whether to perform one or more mode-dependent control operations in the full-duplex mode or the half-duplex mode. For example, in some aspects, performing the control operations in the full-duplex mode may enable the UE to select and/or refine transmit and receive beam pairs that provide sufficient spatial isolation to minimize or mitigate self-interference, may cause the UE to perform the control operations based on an expected duplexing state that would occur if the UE were to perform the uplink transmission, and/or may conserve resources that may otherwise be consumed if the UE were to repeatedly switch between the full-duplex mode and the half-duplex mode. Accordingly, when the UE performs the mode-dependent control operations in the full-duplex mode, the one or more mode-dependent control operations may include selecting a first beam for uplink transmission and selecting a second beam for downlink reception. For example, the first beam and the second beam may be associated with different panels or otherwise provide sufficient spatial isolation to avoid self-interference that may be caused by signal leakage and/or reflection. Furthermore, in cases where the UE determines that a channel state information reference signal (CSI-RS) is the downlink transmission that is concurrent with the skipped uplink transmission, the UE may configure a CSF report associated with the CSI-RS to include self-interference measurements captured at the UE. In some aspects, the UE may generate the CSF report based on filtering one or more instantaneous channel and/or interference measurements or CSF for the full-duplex mode. Additionally, or alternatively, the CSF report may be associated with one or more receive beams that are suitable for the full-duplex mode, which may differ from one or more receive beams that maximize channel gain in the half-duplex mode. Furthermore, when the mode-dependent control operations are performed in the full-duplex mode, the UE may select a TCI state associated with the full-duplex mode to receive a PDCCH if a search space set and control resource set (CORESET) are associated with the full-duplex mode.

Alternatively, rather than performing mode-dependent control operations in the full-duplex mode when the UE skips an uplink transmission that would have resulted in a full-duplex operation, the UE may perform the mode-dependent control operations in the half-duplex mode to reflect actual (e.g., downlink-only half-duplex) operation at the UE. In such cases, because there is no uplink transmission to self-interfere with downlink reception, the UE may not be restricted to use spatially isolated transmit and receive beams and/or may not be subject to a restriction on a maximum transmit power that is in effect to mitigate self-interference. Accordingly, when the UE performs the mode-dependent control operations in the half-duplex mode, the one or more mode-dependent control operations may include selecting a common beam for uplink transmission and downlink reception. For example, in some aspects, the common beam may be associated with a maximum channel gain. Furthermore, in cases where the UE determines that a CSI-RS is the downlink transmission that is concurrent with the skipped uplink transmission, the UE may configure a CSF report associated with the CSI-RS to exclude self-interference measurements, which are not relevant to downlink-only half-duplex communication. In such cases, when the CSF report is configured to exclude self-interference measurements, the UE may set a flag in signaling associated with the CSF report to indicate that the CSF report is based on the half-duplex mode such that the base station does not incorrectly assume that the CSI-RS collided with a resource of the scheduled PUSCH. Additionally, or alternatively, the CSF report may be associated with one or more receive beams that are suitable for downlink reception in the half-duplex mode, which may differ from the receive beams that provide sufficient spatial isolation from transmit beams used in the full-duplex mode. Furthermore, when the mode-dependent control operations are performed in the half-duplex mode, the UE may select a TCI state associated with the half-duplex mode to receive a PDCCH if a search space set and CORESET are associated with the full-duplex mode. For example, for a PDCCH, reliability may be more important than throughput, whereby the UE may select a half-duplex TCI state that increases reliability of PDCCH reception.

As indicated above, FIG. 5 is provided as an example. Other examples may differ from what is described with regard to FIG. 5.

Figure 6:
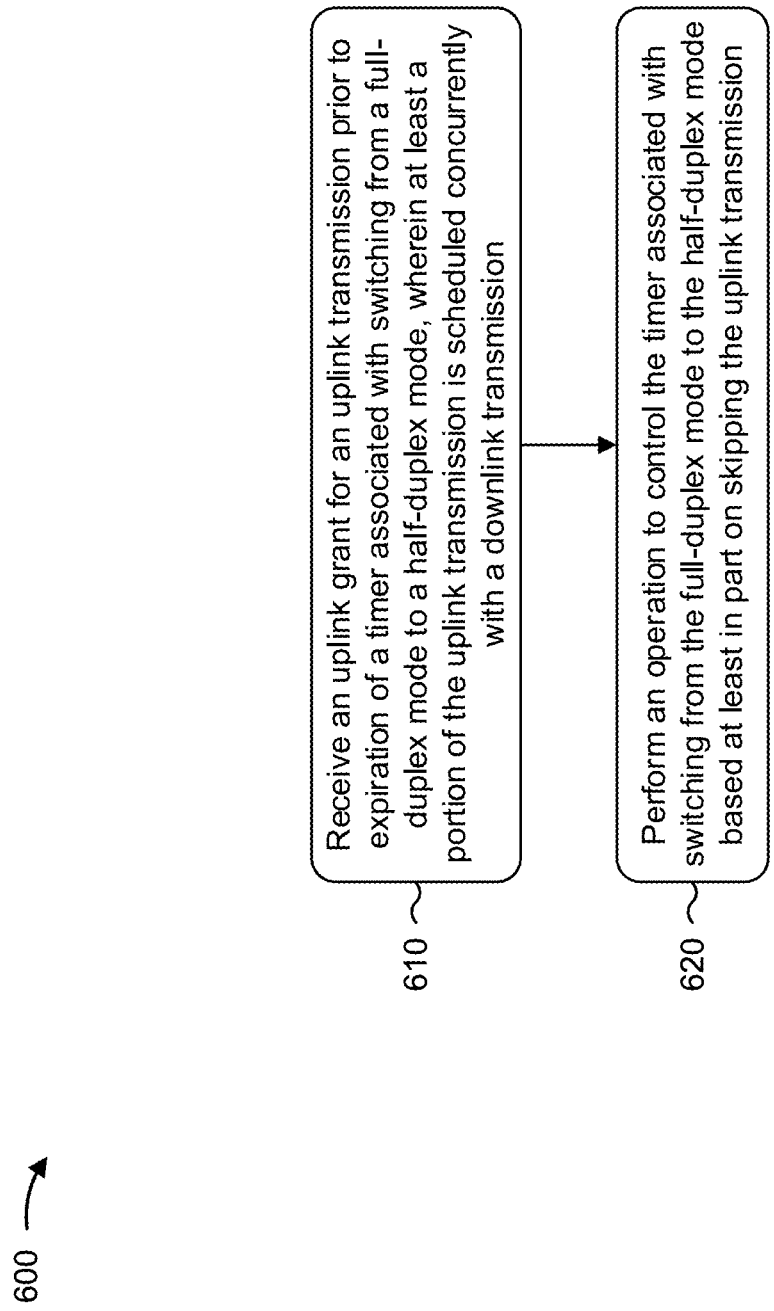
FIG. 6 is a flowchart of an example method of wireless communication.

FIG. 6 is a flowchart of an example method 600 of wireless communication. The method 600 may be performed by, for example, a UE (e.g., UE 120).

At 610, the UE may receive an uplink grant for an uplink transmission prior to expiration of a timer associated with switching from a full-duplex mode to a half-duplex mode, wherein at least a portion of the uplink transmission is scheduled concurrently with a downlink transmission. For example, the UE (e.g., using communication manager 140 and/or reception component 702, depicted in FIG. 7) may receive an uplink grant for an uplink transmission prior to expiration of a timer associated with switching from a full-duplex mode to a half-duplex mode, wherein at least a portion of the uplink transmission is scheduled concurrently with a downlink transmission, as described above in connection with, for example, FIG. 5 at 510 and 525.

At 620, the UE may perform an operation to control the timer associated with switching from the full-duplex mode to the half-duplex mode based at least in part on skipping the uplink transmission. For example, the UE (e.g., using communication manager 140 and/or control component 708, depicted in FIG. 7) may perform an operation to control the timer associated with switching from the full-duplex mode to the half-duplex mode based at least in part on skipping the uplink transmission, as described above in connection with, for example, FIG. 5 at 530. In some aspects, the operation includes maintaining the timer associated with switching from the full-duplex mode to the half-duplex mode. In some aspects, the operation includes resetting the timer associated with switching from the full-duplex mode to the half-duplex mode.

In some aspects, method 600 includes performing one or more control operations associated with the full-duplex mode based at least in part on skipping the uplink transmission. In some aspects, the one or more control operations include selecting a receive beam for the downlink transmission that is different from a transmit beam associated with the uplink transmission. In some aspects, method 600 includes determining that the downlink transmission scheduled concurrently with the uplink transmission is a CSI-RS, and the one or more control operations include configuring a CSF report associated with the CSI-RS to include one or more self-interference measurements. In some aspects, the one or more control operations include selecting a TCI state associated with the full-duplex mode to receive a PDCCH.

In some aspects, method 600 includes performing one or more control operations associated with the half-duplex mode based at least in part on skipping the uplink transmission. In some aspects, the one or more control operations include selecting a receive beam for the downlink transmission that corresponds to a transmit beam associated with the uplink transmission. In some aspects, method 600 includes determining that the downlink transmission scheduled concurrently with the uplink transmission is a CSI-RS, and the one or more control operations include excluding one or more self-interference measurements from a CSF report associated with the CSI-RS. In some aspects, the one or more control operations include setting a flag in signaling associated with the CSF report to indicate that the CSF report is based on the half-duplex mode. In some aspects, alone or in combination with one or more of the first through tenth aspects, the one or more control operations include selecting a TCI state associated with the half-duplex mode to receive a physical downlink control channel.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
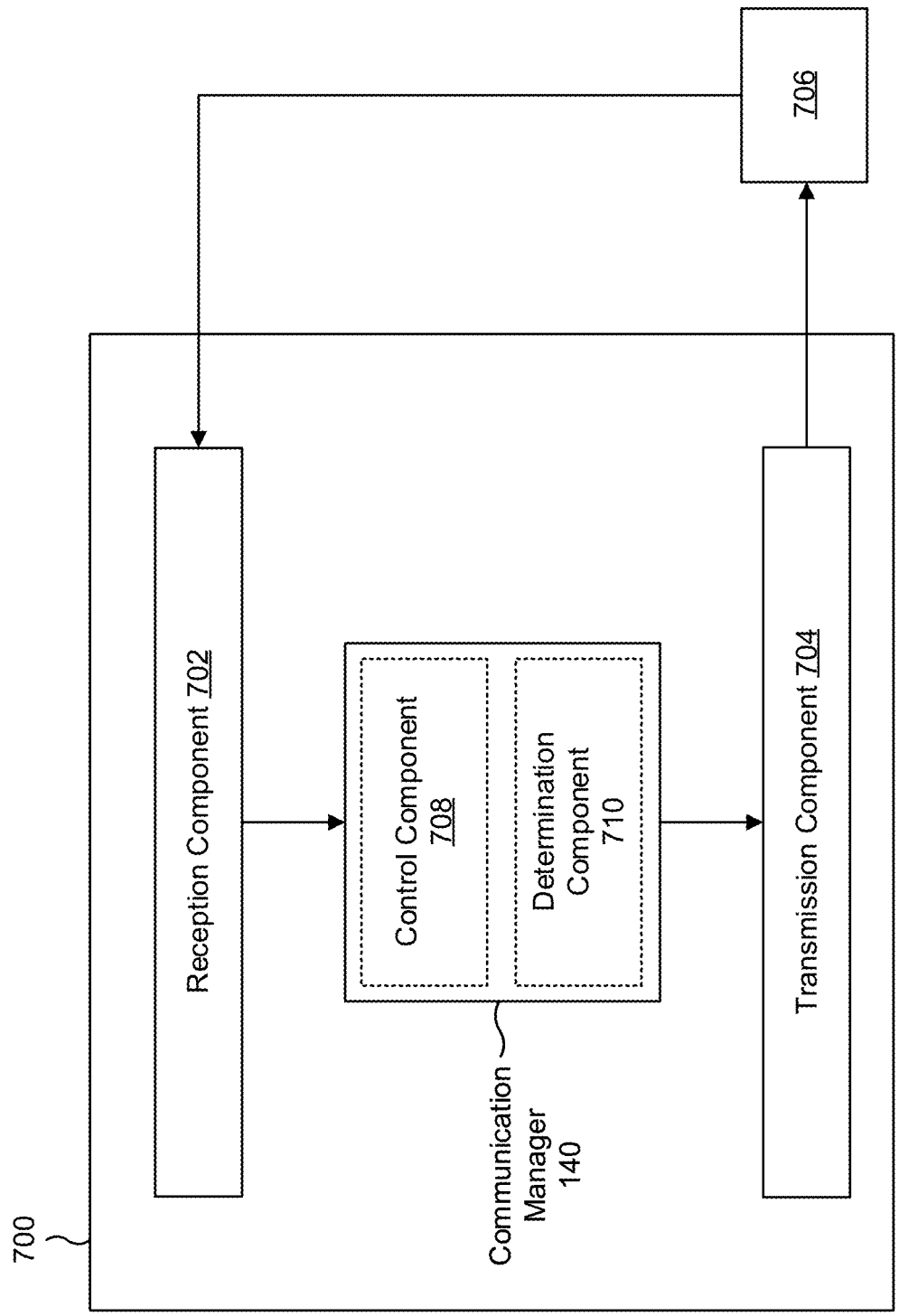
FIG. 7 is a block diagram of an example apparatus for wireless communication.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a control component 708 or a determination component 710, among other examples.

In some aspects, the apparatus 700 may be configured to perform one or more operations described herein in connection with FIG. 5. Additionally, or alternatively, the apparatus 700 may be configured to perform one or more methods described herein, such as method 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive an uplink grant for an uplink transmission prior to expiration of a timer associated with switching from a full-duplex mode to a half-duplex mode, wherein at least a portion of the uplink transmission is scheduled concurrently with a downlink transmission. The control component 708 may perform an operation to control the timer associated with switching from the full-duplex mode to the half-duplex mode based at least in part on skipping the uplink transmission.

The control component 708 may perform one or more control operations associated with the full-duplex mode based at least in part on skipping the uplink transmission.

The determination component 710 may determine that the downlink transmission scheduled concurrently with the uplink transmission is a CSI-RS, and the one or more control operations include configuring a CSF report associated with the CSI-RS to include one or more self-interference measurements.

The control component 708 may perform one or more control operations associated with the half-duplex mode based at least in part on skipping the uplink transmission.

The determination component 710 may determine that the downlink transmission scheduled concurrently with the uplink transmission is a CSI-RS, and the one or more control operations include excluding one or more self-interference measurements from a channel state CSF report associated with the CSI-RS.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
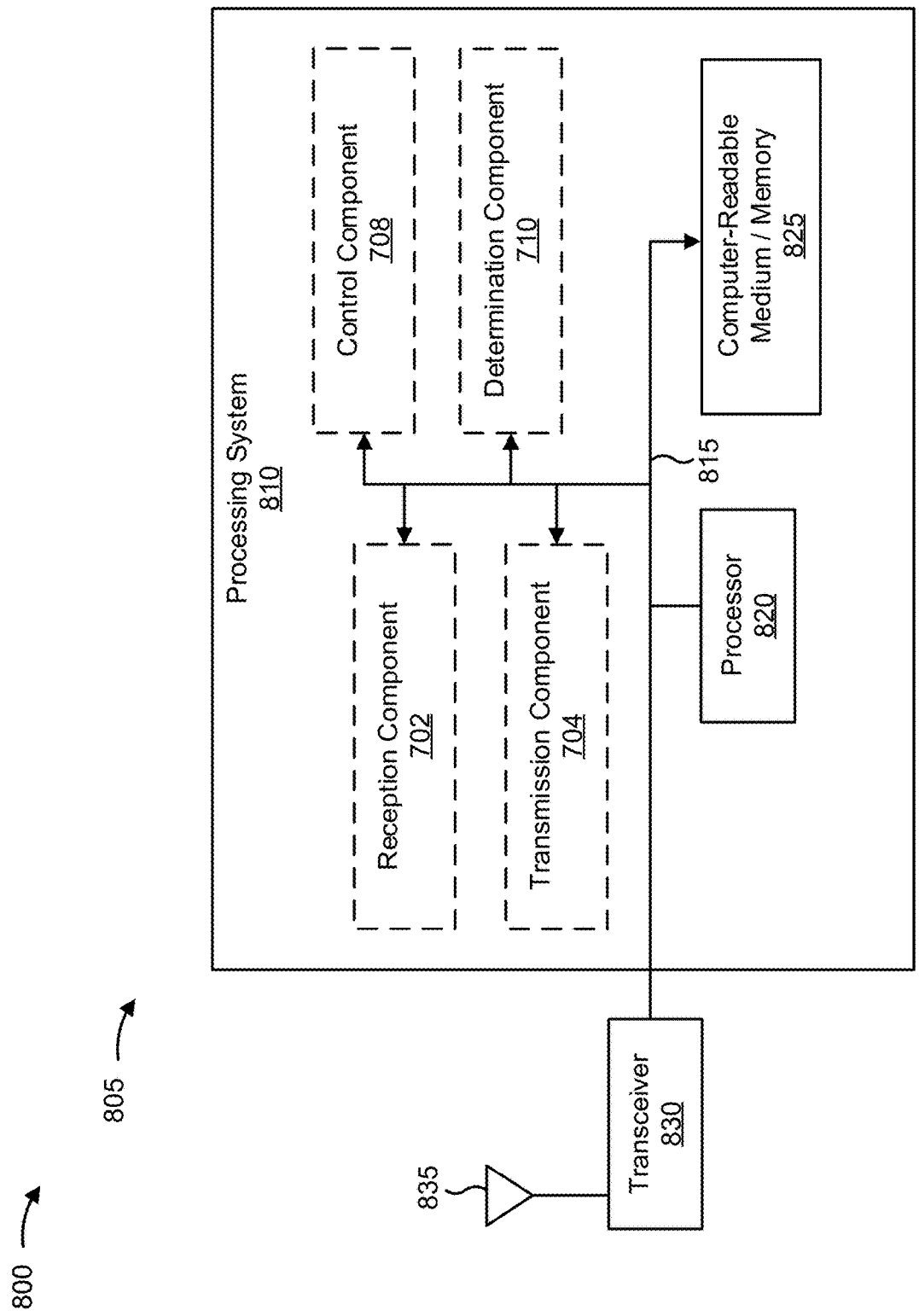
FIG. 8 is a diagram illustrating an example of a hardware implementation for an apparatus employing a processing system.

FIG. 8 is a diagram illustrating an example 800 of a hardware implementation for an apparatus 805 employing a processing system 810. The apparatus 805 may be a UE.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the illustrated components, and the computer-readable medium/memory 825. The bus 815 may also link various other circuits, such as timing sources, peripherals, voltage regulators, and/or power management circuits.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 702. In addition, the transceiver 830 receives information from the processing system 810, specifically the transmission component 704, and generates a signal to be applied to the one or more antennas 835 based at least in part on the received information.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the illustrated components. The components may be software modules running in the processor 820, resident/stored in the computer readable medium/memory 825, one or more hardware modules coupled to the processor 820, or some combination thereof.

In some aspects, the processing system 810 may be a component of the UE 120 and may include the memory 282 and/or at least one of the TX MIMO processor 266, the RX processor 258, and/or the controller/processor 280. In some aspects, the apparatus 805 for wireless communication includes means for receiving an uplink grant for an uplink transmission prior to expiration of a timer associated with switching from a full-duplex mode to a half-duplex mode, wherein at least a portion of the uplink transmission is scheduled concurrently with a downlink transmission; and means for performing an operation to control the timer associated with switching from the full-duplex mode to the half-duplex mode based at least in part on skipping the uplink transmission. The aforementioned means may be one or more of the aforementioned components of the apparatus 700 and/or the processing system 810 of the apparatus 805 configured to perform the functions recited by the aforementioned means. As described elsewhere herein, the processing system 810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

The following provides an overview of some Aspects of the present disclosure:

Aspect 1: A method of wireless communication performed by a UE, comprising: receiving an uplink grant for an uplink transmission prior to expiration of a timer associated with switching from a full-duplex mode to a half-duplex mode, wherein at least a portion of the uplink transmission is scheduled concurrently with a downlink transmission; and performing an operation to control the timer associated with switching from the full-duplex mode to the half-duplex mode based at least in part on skipping the uplink transmission.

Aspect 2: The method of Aspect 1, wherein the operation includes maintaining the timer associated with switching from the full-duplex mode to the half-duplex mode.

Aspect 3: The method of Aspect 1, wherein the operation includes resetting the timer associated with switching from the full-duplex mode to the half-duplex mode.

Aspect 4: The method of any of Aspects 1-3, further comprising: performing one or more control operations associated with the full-duplex mode based at least in part on skipping the uplink transmission.

Aspect 5: The method of Aspect 4, wherein the one or more control operations include selecting a receive beam for the downlink transmission that is different from a transmit beam associated with the uplink transmission.

Aspect 6: The method of any of Aspects 4-5, further comprising: determining that the downlink transmission scheduled concurrently with the uplink transmission is a CSI-RS, wherein the one or more control operations include configuring a CSF report associated with the CSI-RS to include one or more self-interference measurements.

Aspect 7: The method of any of Aspects 4-6, wherein the one or more control operations include selecting a TCI state associated with the full-duplex mode to receive a PDCCH.

Aspect 8: The method of any of Aspects 1-3, further comprising: performing one or more control operations associated with the half-duplex mode based at least in part on skipping the uplink transmission.

Aspect 9: The method of Aspect 8, wherein the one or more control operations include selecting a receive beam for the downlink transmission that corresponds to a transmit beam associated with the uplink transmission.

Aspect 10: The method of any of Aspects 8-9, further comprising: determining that the downlink transmission scheduled concurrently with the uplink transmission is a CSI-RS, wherein the one or more control operations include excluding one or more self-interference measurements from a CSF report associated with the CSI-RS.

Aspect 11: The method of Aspect 10, wherein the one or more control operations include setting a flag in signaling associated with the CSF report to indicate that the CSF report is based on the half-duplex mode.

Aspect 12: The method of any of Aspects 8-11, wherein the one or more control operations include selecting a TCI state associated with the half-duplex mode to receive a PDCCH.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive an uplink grant for an uplink transmission prior to expiration of a timer associated with switching from a full-duplex mode to a half-duplex mode, wherein at least a portion of the uplink transmission is scheduled concurrently with a downlink transmission; and
      perform an operation to control the timer associated with switching from the full-duplex mode to the half-duplex mode based at least in part on skipping the uplink transmission.

2. The UE of claim 1, wherein the operation includes maintaining the timer associated with switching from the full-duplex mode to the half-duplex mode.

3. The UE of claim 1, wherein the operation includes resetting the timer associated with switching from the full-duplex mode to the half-duplex mode.

4. The UE of claim 1, wherein the one or more processors are further configured to:
   perform one or more control operations associated with the full-duplex mode based at least in part on skipping the uplink transmission.

5. The UE of claim 4, wherein the one or more control operations include selecting a receive beam for the downlink transmission that is different from a transmit beam associated with the uplink transmission.

6. The UE of claim 4, wherein the one or more processors are further configured to:
   determine that the downlink transmission scheduled concurrently with the uplink transmission is a channel state information reference signal (CSI-RS), wherein the one or more control operations include configuring a channel state feedback report associated with the CSI-RS to include one or more self-interference measurements.

7. The UE of claim 4, wherein the one or more control operations include selecting a transmission configuration indication state associated with the full-duplex mode to receive a physical downlink control channel.

8. The UE of claim 1, wherein the one or more processors are further configured to:
   perform one or more control operations associated with the half-duplex mode based at least in part on skipping the uplink transmission.

9. The UE of claim 8, wherein the one or more control operations include selecting a receive beam for the downlink transmission that corresponds to a transmit beam associated with the uplink transmission.

10. The UE of claim 8, wherein the one or more processors are further configured to:
    determine that the downlink transmission scheduled concurrently with the uplink transmission is a channel state information reference signal (CSI-RS), wherein the one or more control operations include excluding one or more self-interference measurements from a channel state feedback (CSF) report associated with the CSI-RS.

11. The UE of claim 10, wherein the one or more control operations include setting a flag in signaling associated with the CSF report to indicate that the CSF report is based on the half-duplex mode.

12. The UE of claim 8, wherein the one or more control operations include selecting a transmission configuration indication state associated with the half-duplex mode to receive a physical downlink control channel.

13. A method of wireless communication performed by a user equipment (UE), comprising:
    receiving an uplink grant for an uplink transmission prior to expiration of a timer associated with switching from a full-duplex mode to a half-duplex mode, wherein at least a portion of the uplink transmission is scheduled concurrently with a downlink transmission; and
    performing an operation to control the timer associated with switching from the full-duplex mode to the half-duplex mode based at least in part on skipping the uplink transmission.

14. The method of claim 13, wherein the operation includes maintaining the timer associated with switching from the full-duplex mode to the half-duplex mode.

15. The method of claim 13, wherein the operation includes resetting the timer associated with switching from the full-duplex mode to the half-duplex mode.

16. The method of claim 13, further comprising:
    performing one or more control operations associated with the full-duplex mode based at least in part on skipping the uplink transmission.

17. The method of claim 16, wherein the one or more control operations include selecting a receive beam for the downlink transmission that is different from a transmit beam associated with the uplink transmission.

18. The method of claim 16, further comprising:
    determining that the downlink transmission scheduled concurrently with the uplink transmission is a channel state information reference signal (CSI-RS), wherein the one or more control operations include configuring a channel state feedback report associated with the CSI-RS to include one or more self-interference measurements.

19. The method of claim 16, wherein the one or more control operations include selecting a transmission configuration indication state associated with the full-duplex mode to receive a physical downlink control channel.

20. The method of claim 13, further comprising:
performing one or more control operations associated with the half-duplex mode based at least in part on skipping the uplink transmission.

21. The method of claim 20, wherein the one or more control operations include selecting a receive beam for the downlink transmission that corresponds to a transmit beam associated with the uplink transmission.

22. The method of claim 20, further comprising:
determining that the downlink transmission scheduled concurrently with the uplink transmission is a channel state information reference signal (CSI-RS), wherein the one or more control operations include excluding one or more self-interference measurements from a channel state feedback (CSF) report associated with the CSI-RS.

23. The method of claim 22, wherein the one or more control operations include setting a flag in signaling associated with the CSF report to indicate that the CSF report is based on the half-duplex mode.

24. The method of claim 20, wherein the one or more control operations include selecting a transmission configuration indication state associated with the half-duplex mode to receive a physical downlink control channel.

25. A non-transitory computer-readable medium storing a set of instructions for wireless communication, the set of instructions comprising:
one or more instructions that, when executed by one or more processors of a user equipment (UE), cause the UE to:
receive an uplink grant for an uplink transmission prior to expiration of a timer associated with switching from a full-duplex mode to a half-duplex mode, wherein at least a portion of the uplink transmission is scheduled concurrently with a downlink transmission; and
perform an operation to control the timer associated with switching from the full-duplex mode to the half-duplex mode based at least in part on skipping the uplink transmission.

26. The non-transitory computer-readable medium of claim 25, wherein the one or more instructions further cause the UE to maintain the timer associated with switching from the full-duplex mode to the half-duplex mode.

27. The non-transitory computer-readable medium of claim 25, wherein the one or more instructions further cause the UE to reset the timer associated with switching from the full-duplex mode to the half-duplex mode.

28. The non-transitory computer-readable medium of claim 25, wherein the one or more instructions further cause the UE to:
perform one or more control operations associated with the full-duplex mode based at least in part on skipping the uplink transmission.

29. The non-transitory computer-readable medium of claim 25, wherein the one or more instructions further cause the UE to:
perform one or more control operations associated with the half-duplex mode based at least in part on skipping the uplink transmission.

30. An apparatus for wireless communication, comprising:
means for receiving an uplink grant for an uplink transmission prior to expiration of a timer associated with switching from a full-duplex mode to a half-duplex mode, wherein at least a portion of the uplink transmission is scheduled concurrently with a downlink transmission; and
means for performing an operation to control the timer associated with switching from the full-duplex mode to the half-duplex mode based at least in part on skipping the uplink transmission.

* * * * *